United States Patent [19]

Svab et al.

[11] Patent Number: 5,170,869
[45] Date of Patent: Dec. 15, 1992

[54] GEAR SELECTOR PARKING RATCHET FOR AUTOMATIC TRANSMISSIONS

[75] Inventors: Eugen Svab; Andreas Luiken, both of Cologne, Fed. Rep. of Germany

[73] Assignee: Ford Motor Company, Dearborn, Mich.

[21] Appl. No.: 702,482

[22] Filed: May 20, 1991

[30] Foreign Application Priority Data

Jun. 18, 1990 [DE] Fed. Rep. of Germany ....... 4019334

[51] Int. Cl.5 ...................... F16D 65/14; B60K 41/26
[52] U.S. Cl. ..................................... 192/4 A; 188/31
[58] Field of Search ........................... 192/4 A; 188/31

[56] References Cited

U.S. PATENT DOCUMENTS

| 1,935,414 | 11/1933 | Raber | 192/4 A |
|---|---|---|---|
| 2,865,227 | 12/1958 | Kelley et al. | 192/4 A X |
| 2,954,103 | 9/1960 | Sand | 192/4 A |
| 2,964,135 | 12/1960 | Sand | 192/4 A X |
| 2,974,752 | 3/1961 | Howard | 192/4 A |
| 3,703,941 | 11/1972 | Ohie et al. | 188/31 |
| 3,952,838 | 4/1976 | Osten et al. | 192/4 A X |
| 3,990,541 | 11/1976 | Dobrinska et al. | 192/4 A X |
| 4,177,886 | 12/1979 | Hiraiwa et al. | 188/31 X |
| 4,519,483 | 5/1985 | Schlicker | 192/4 A |
| 4,585,103 | 4/1986 | Kuwayama et al. | 192/4 A |
| 4,671,133 | 6/1987 | Yamada | 188/31 X |
| 4,934,490 | 6/1990 | Chang | 192/4 A X |
| 4,979,783 | 12/1990 | Johnson | 192/4 A X |
| 5,029,681 | 7/1991 | Swiatek | 192/4 A |

FOREIGN PATENT DOCUMENTS

| 33967 | 8/1981 | European Pat. Off. | 192/4 A |
|---|---|---|---|
| 2101822 | 5/1980 | Fed. Rep. of Germany . | |
| 3241789 | 8/1985 | Fed. Rep. of Germany . | |
| 3537091 | 4/1987 | Fed. Rep. of Germany . | |
| 3638045 | 5/1988 | Fed. Rep. of Germany | 192/4 A |
| 1456758 | 11/1976 | United Kingdom | 188/31 |

Primary Examiner—Leslie A. Braun
Assistant Examiner—Nicholas Whitelaw
Attorney, Agent, or Firm—Frank G. McKenzie; Roger L. May

[57] ABSTRACT

A toothed wheel, driveably connected to an output element of the transmission, has a spring loaded parking pawl engaged between the teeth of the wheel. The pawl carries a roller contacted in top-dead-center position by a surface of a locking cam biased by a spring into contact with the roller. The locking cam is connected to a gear selector position lever positively in one rotary direction and non-positively in the opposite direction.

12 Claims, 2 Drawing Sheets

GEAR SELECTOR PARKING RATCHET FOR AUTOMATIC TRANSMISSIONS

BACKGROUND OF THE INVENTION

1. Field of the Invention

This invention relates to the field of automatic transmission gear selector mechanisms. In particular, the invention pertains to a parking lock mechanism that prevents movement of the vehicle driveline when the gear selector is in the park position.

2. Description of the Prior Art

German Patentschrift DE-PS 32 41 789 describes a continuously variable conical pulley automatic transmission having a parking ratchet drivably connected to the secondary pulley and actuated by a rod and force accumulator substantially of the kind described in German Patentschrift DE-PS 35 37 091.

The rod connection to the spring-loaded actuating sleeve, which can be displaced perpendicularly to the plane of the parking pawl, is expensive to produce and to assemble.

SUMMARY OF THE INVENTION

An object of this invention is to provide a parking lock for an automatic transmission gear shift mechanism, which has substantially lower construction and assembly costs than those of the prior art and is still highly reliable during operation. These objects are achieved in the parking lock mechanism according to this invention. A toothed wheel is drivably connected to an output element of the transmission. A pawl, loaded by a spring out of engagement with the wheel, is brought by an actuating connection into engagement with the wheel. The actuator is connected to the manual selector lever and has a notched cam surface defining the various shift positions among which the manual selector lever of the transmission becomes engaged by a spring catch.

A locking cam is connected to the position lever positively in one direction of rotation and non-positively in the other direction, The locking cam engages a roller rotatably mounted on the parking pawl so that when the pawl encounters a tooth on the wheel, a coil spring is pretensioned, and when the pawl encounters a gap between teeth on the wheel, the locking cam contacts the roller in a top dead center position.

In this way, a reliable operating parking ratchet is provided with a minimum of constructional and assembly cost and in the smallest possible space.

The parking toothed wheel is preferably fixed on the differential driving wheel or is constructed on the side of a wheel of the interaxle differential.

BRIEF DESCRIPTION OF THE DRAWINGS

The invention is described in more detail with reference to an e illustrated in the drawings.

DESCRIPTION OF THE PREFERRED EMBODIMENT

Figure 1:
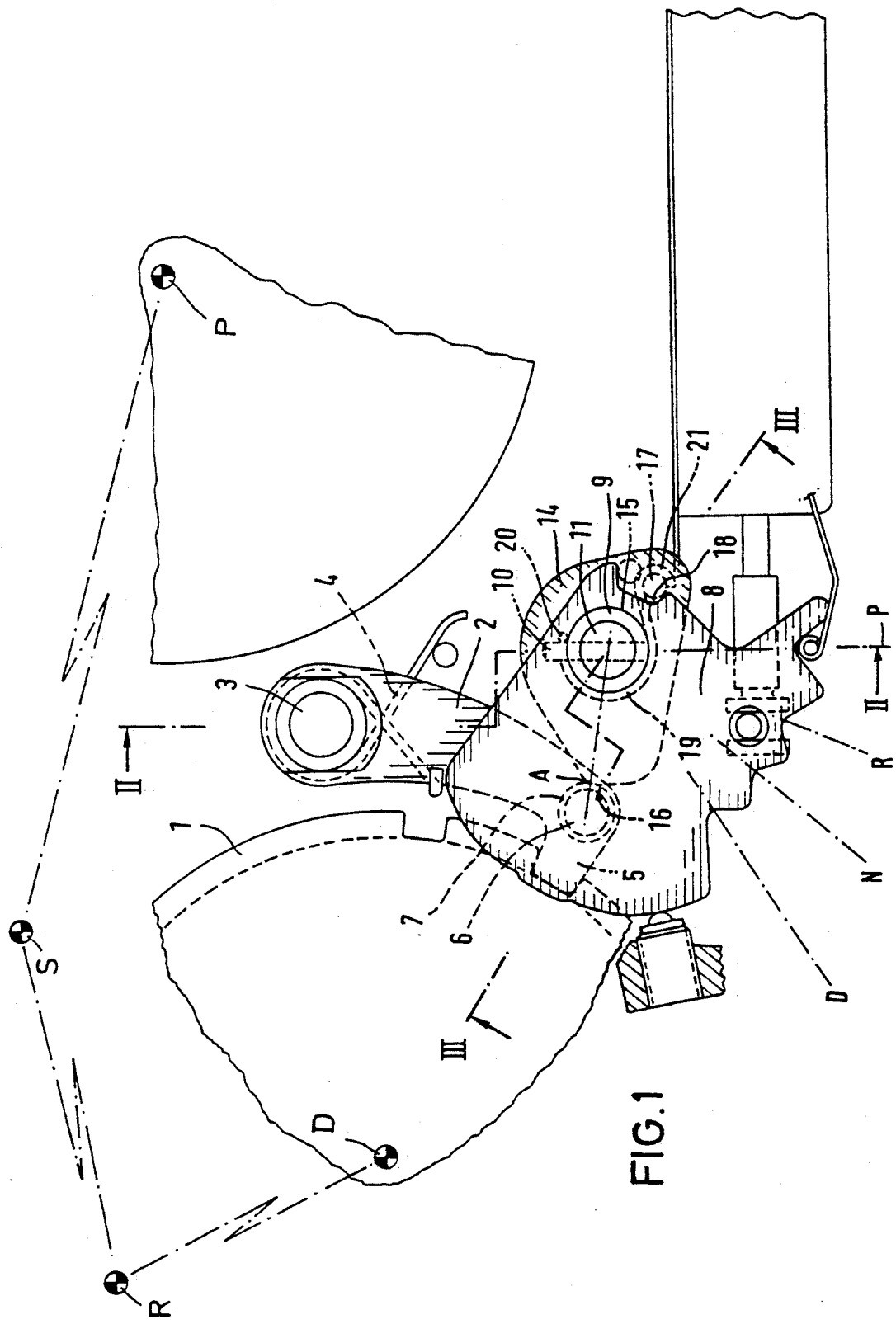
FIG. 1 is a side view of a parking ratchet for an automatic transmission according to the invention.

To clarify the position in an automatic transmission of the parking ratchet, regarding FIG. 1, it is noted that the axes of the primary or driving shaft and of the secondary or driven shaft are arranged transversely in the motor vehicle. The automatic transmission may be of the continuously variable conical-pulley type or a planetary gear discrete-ratio type.

The axis of the primary shaft is designated by P, the axis of the secondary shaft by S, the axis of the stepdown gear by R, and the axis of the differential by D. The distances between axes P and S, S and R, and R and D have been shortened. Only the distance between axes P and D is drawn to scale.

The parking ratchet according to this invention includes a parking toothed wheel 1 (only a portion of which is illustrated), and a parking pawl 2, which is pivotably mounted around a bolt 3 located to the side of the wheel 1 in the transmission housing. The pawl is normally kept out of engagement with wheel 1 in a rest position by a restoring spring 4 contacting a stationary pin and developing a force on the pawl urging it out of engagement with the wheel.

Pawl 2 carries at its free end, the end distant from its pivotal connection on bolt 3, a locking tooth 5 suited to fit in the spaces between the teeth of the wheel. The pawl supports a bolt 6 on which a roller 7 is rotatably mounted.

Figures 2, 3:
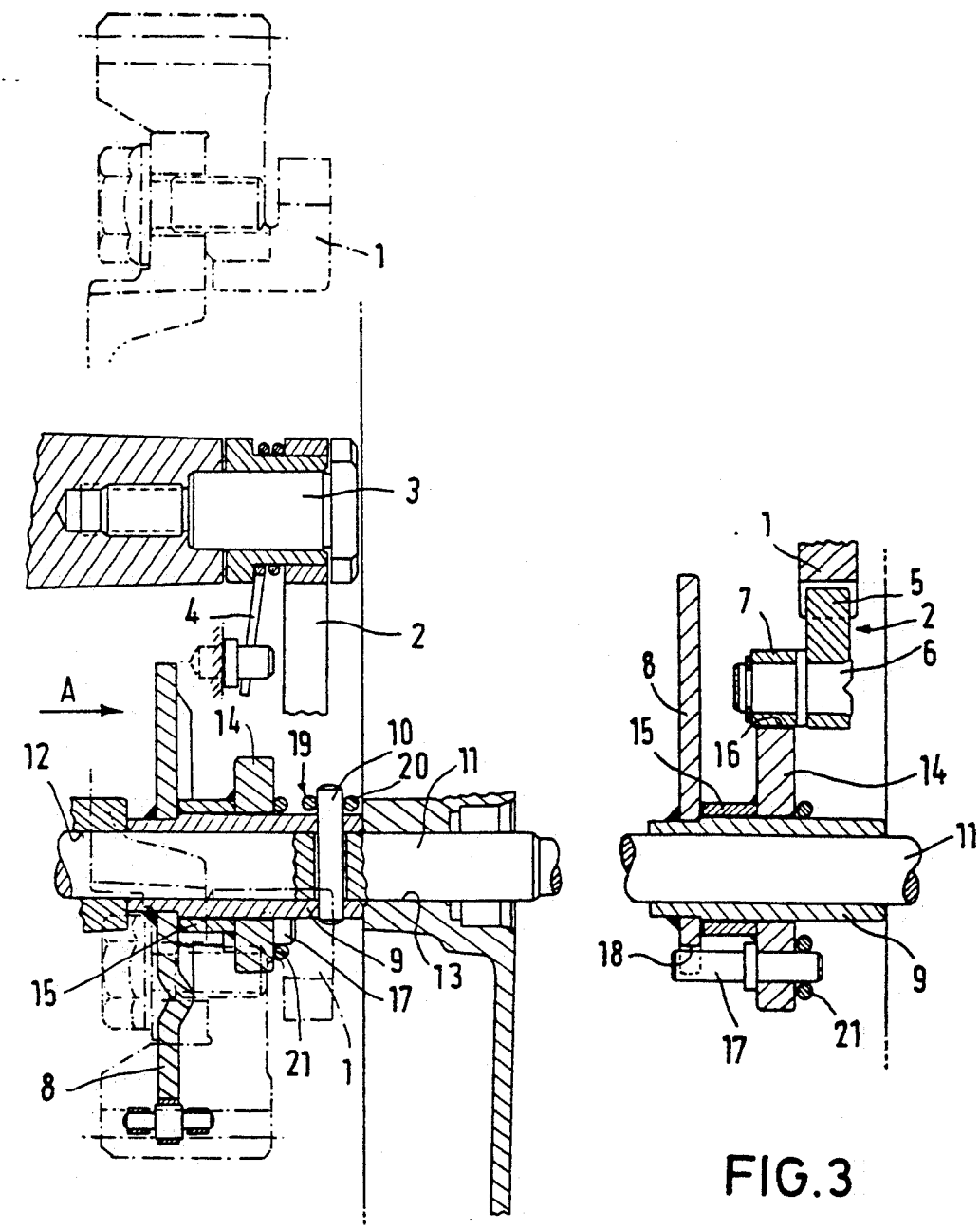
FIG. 2 is a cross section taken along the line II—II of FIG. 1 showing the parking toothed wheel and the differential driving wheel in dot-dash lines.
FIG. 3 is a cross section taken at line III—III in FIG. 1.

A gear shift selector position lever 8, actuated by a Bowden cable connected also to the manual selector lever of the transmission, is rigidly connected in the transmission housing to a sleeve 9, fixed by a pin 10 to a shaft 11, which is rotatably mounted in bearing bores 12, 13 in the transmission housing as seen in FIG. 2. A locking cam 14, rotatably mounted by a sleeve 15, is supported rotatably on sleeve 9.

At a first angular position about the axis of shaft 11, locking cam 14 has a locking nose 16 and, at a second angular position, a laterally projecting bolt 17, which engages a recess 18 in the position lever 8.

A coil spring 19 has a first end 20 encircling pin 10, whose angular position is fixed by the angular position of lever 8, and a second end 21 encircling bolt 17 on the locking cam 14. Spring 19 urges the locking cam to rotate about the axis of shaft 11 in a clockwise direction, when viewed as in FIG. 1.

The position lever 8 is shown in FIG. 1 in the park position; the other positions among which the gear shift lever may be moved are indicated by dot-dash lines designated R, N and D.

FIGS. 1-3 show the condition of the mechanism when tooth 5 of parking pawl 2 is located in a gap between the teeth formed on the outer periphery of wheel 1. When pawl 2 is in this position, contact occurs at point A between roller 7, which is supported rotatably by bolt 6 on pawl 2, and the locking nose 16 on the locking cam 14. In this position, the locking cam is located in a top dead center position, i.e., a force applied to pawl 2 tending to disengage locking tooth 5 from the gap between teeth of wheel 1, presses the locking cam even more strongly into engagement with roller 7 and prevents disengagement of the pawl from the wheel. Point A is located substantially colinear with a line connecting the axes of bolt 6 and shaft 11.

If the manual selector lever of the transmission is moved into the PARK location, and the position lever 8 is pivoted thereby into its PARK position, and the locking tooth 5 on the end of the pawl contacts an outer radial surface of a tooth on wheel 1, the position lever 8 can move among its various positions, but locking cam 14 is prevented by the parking pawl from rotating clockwise to the position in FIG. 1. Rotation of the locking cam 14 is limited by engagement of bolt 17 in the recess 18 formed in position lever 8. As position lever 8 rotates to the PARK position, the end 20 of coiled spring 19 moves clockwise about shaft 11, greater spring force is exerted by the end 21 of coiled spring 19 on bolt 17. But while the pawl remains disengaged from a gap on wheel 1, locking cam 14 is disposed angularly counterclockwise from the position of FIG. 1 and the bolt 17 is forced against the upper edge of recess 18.

If parking pawl 2 drops into a gap between teeth of wheel 1 as a result of subsequent rotation of the output element of the transmission, the force accumulator represented by coil spring 19 pivots locking cam 14 clockwise into its locking condition where contact point A is established between roller 7 on pin 6 and the locking nose 16 on the end of locking cam 8. Again, when in this position, contact point 8 is at a top dead center position, colinear with a line connecting the centers of bolt 6 and shaft 11. Bolt 17 then contacts the lower edge of recess 18 due to the force of spring 19.

When lever 8 moves from the PARK position after the pawl locks and holds wheel 1, pin 17 is forced upward by the edge of recess 18 and cam 14 rotates counterclockwise as pin 17 moves in that direction. This clears space for pawl 2 to rotate out of the gap and spring 4 causes the pawl to disengage the wheel.

Restoring spring 4 of parking pawl 2 can be a simple leg spring or a coil spring with several concentric coils. Coil spring 19 may be a coil with several coils, but the force of the spring 19 must be able reliably to overcome the force produced by restoring spring 14 tending to disengage the parking pawl from the gaps between the teeth of wheel 1.

The parking toothed wheel 1 can be fixed as a separate component on the driving pinion or gear wheel of a differential mechanism located between wheels or between axes of the vehicle. The teeth of the parking toothed wheel 1 can be located directly on the side of the ring of the differential driving gear wheel.

Having described a preferred embodiment of our invention, what we claim and desire to secure by U.S. Letters Patent is:

1. In an automotive vehicle having an automatic transmission gear selector moveable among several positions, a device for preventing movement in a driveline, comprising:
    a wheel having teeth spaced by gaps, driveably connected to the driveline;
    a pivotably mounted pawl, releasably engageable with the gaps on the wheel;
    a position lever connected to the gear selector, mounted for rotation about a first axis as the gear selector moves, having detent notches thereon corresponding to the positions of the gear selector;
    a locking cam having a locking surface pivotably mounted about a first axis for rotation in a first rotary direction to a position of contact with the pawl where the pawl is prevented from disengaging the wheel and the wheel is prevented from rotating, and for rotation in a second rotary direction to a position out of contact with the pawl where the pawl disengages the wheel; and
    a spring fixed to the position lever, rotatably interconnecting the position lever and the locking cam, resiliently biasing the locking cam to rotate in said first rotary direction to said position of contact and permitting the locking cam to rotate in said second rotary direction out of contact with the pawl.

2. The device of claim 1 wherein the spring interconnects the position lever and locking cam in the first rotary direction and releases said interconnection in the second rotary direction.

3. The device of claim 1 wherein the position lever has a recess defining contact surfaces mutually spaced angularly about the first axis; and
    the locking cam further comprises a pin fixed to said locking cam, extending into said recess, and restrained with respect to movement about the first axis by contact between the pin and the contact surfaces of the recess.

4. The device of claim 1 wherein the pawl further comprises a roller rotatably mounted about a second axis, the locking surface of the locking cam contacting the roller at a point located substantially on a line connecting the first and second axes when the pawl is located in a gap between teeth of the wheel.

5. The device of claim 1 further comprising a resilient detent means for releasably engaging the notches of the position lever and for resisting rotation of the position lever, wherein the detent notches of the position lever include a detent notch corresponding to a park position of the gear selector, and the locking cam is biased by a force produced by the spring as the position lever rotates so that its park position is engaged by said detent means at a position of contact with the pawl where the pawl is prevented from disengaging the wheel and the wheel is prevented from rotating.

6. The device of claim 3 wherein the contact surfaces of the position lever recess comprise:
    a first contact surface located such that the pin of the locking cam engages said first contact surface and prevents rotation of the locking cam about the first axis in the first direction when the locking cam contacts the pawl to prevent rotation of the wheel and the locating lever is held in the park position by the detent means; and
    a second contact surface located such that the pin of the locking cam engages said second contact surface and prevents rotation of the locking cam about the first axis in the second direction when the locking cam permits the pawl to disengage the wheel.

7. The device of claim 2 wherein the position lever has a recess defining contact surfaces mutually spaced angularly about the first axis; and
    the locking cam further comprises a pin fixed to said locking cam, extending into said recess, and restrained with respect to movement about the first axis by contact between the pin and the contact surfaces of the recess.

8. The device of claim 7 wherein the pawl further comprises a roller rotatably mounted about a second axis, the locking cam contacts the roller at a point located substantially on a line connecting the first and second axes when the pawl is located in a gap between teeth of the wheel.

9. In an automotive vehicle having an automatic transmission gear selector moveable among several positions, a device for preventing movement in a driveline, comprising:

means releasably engageable and connected to the driveline;

means for engaging said engageable means;

lever means mounted for rotation about an axis as the gear selector moves, having detent notches thereon corresponding to a park position and other positions of the gear selector;

pivotably mounted locking means, positively connected to the lever means in a first rotary direction, rotatable into contact with the engaging means as the lever means rotates to said park position, biasing potential connection between the engaging means and engageable means when the lever means is in the park position due to resilient contact with the engaging means, and non-positively connected to the lever means in a second rotary direction permitting disengagement of the engaging means and engageable means when the lever means is in a position other than the park position.

10. In an automotive vehicle having an automatic transmission gear selector moveable among several positions, a device for releasably locking a driveline, comprising:

a wheel having teeth spaced by gaps, driveably connected to the driveline;

a pivotably mounted pawl, releasably engageable with the gaps on the wheel;

a position lever connected to the gear selector, having detent notches thereon corresponding to the positions of the gear selector and a recess;

a bolt fixed against displacement, having a surface supporting rotation thereon;

a sleeve mounted for rotation about said bolt, fixed to the position lever, supporting a first pin extending outward therefrom, and rotating with the position lever;

a pivotably mounted locking cam, supporting a second pin extending outwardly therefrom and located in the recess of the position lever, adapted to engage the pawl by rotating in a first rotary direction to a position of contact with the pawl where the pawl is prevented from disengaging the wheel and the wheel is prevented from rotating, and by rotating in a second rotary direction to a position where the pawl disengages the wheel; and spring means rotatably connecting in a first rotary direction the locking cam and position lever by engagement with the first pin to rotate relative to the second point in a second rotary direction.

11. The device of claim 10 wherein the pawl further comprises a rotatably mounted roller, the locking cam contacts the roller at a point located substantially on a line connecting the first and second axes when the pawl is located in a gap between teeth of the wheel.

12. The device of claim 10 further comprising a resilient detent means for releasably engaging the notches of the position lever and for resisting rotation of the position lever, wherein the detent notches of the position lever include a detent notch corresponding to a park position of the gear selector, and the locking cam is biased by a force produced by the spring as the position lever rotates so that its park position is engaged by said detent means to a position of contact with the pawl where the pawl is prevented from disengaging the wheel and the wheel is prevented from rotating.

* * * * *